United States Patent
Zhou et al.

(10) Patent No.: US 8,980,131 B2
(45) Date of Patent: Mar. 17, 2015

(54) SILICATE LUMINESCENT MATERIAL AND ITS PREPARATION METHOD

(75) Inventors: Mingjie Zhou, Shenzhen (CN); Chaopu Shi, Shenzhen (CN); Rong Wang, Shenzhen (CN); Wenbo Ma, Shenzhen (CN)

(73) Assignee: Ocean's King Lighting Science & Technology Co., Ltd., Shenzhen (CN)

( * ) Notice: Subject to any disclaimer, the term of this patent is extended or adjusted under 35 U.S.C. 154(b) by 372 days.

(21) Appl. No.: 13/512,287

(22) PCT Filed: Nov. 28, 2009

(86) PCT No.: PCT/CN2009/075191
§ 371 (c)(1),
(2), (4) Date: May 25, 2012

(87) PCT Pub. No.: WO2011/063571
PCT Pub. Date: Jun. 3, 2011

(65) Prior Publication Data
US 2012/0273727 A1    Nov. 1, 2012

(51) Int. Cl.
*C09K 11/66* (2006.01)
*C09K 11/62* (2006.01)
*C09K 11/59* (2006.01)

(52) U.S. Cl.
CPC ................... *C09K 11/595* (2013.01)
USPC ..................................... 252/301.4 F

(58) Field of Classification Search
CPC ................ C09K 11/595; C09K 11/666
USPC .................................................. 252/301.4 F
See application file for complete search history.

(56) References Cited

U.S. PATENT DOCUMENTS

| 4,208,613 | A | | 6/1980 | Hase et al. |
| 4,231,892 | A | * | 11/1980 | Chang et al. ............ 252/301.6 F |
| 4,795,589 | A | * | 1/1989 | Mikami et al. .......... 252/301.6 F |
| 4,806,822 | A | * | 2/1989 | Takahara et al. .............. 313/467 |
| 7,147,802 | B2 | * | 12/2006 | Sugimoto et al. ........ 252/301.4 F |

FOREIGN PATENT DOCUMENTS

| DE | 2826458 A1 | 1/1979 |
| JP | 6250384 A | 3/1987 |
| JP | 62257981 A | 11/1987 |
| JP | 6240251 A | 8/1994 |
| KR | 100748832 B1 | 8/2007 |
| WO | 00/73400 A | 12/2000 |

* cited by examiner

*Primary Examiner* — Matthew E Hoban
(74) *Attorney, Agent, or Firm* — Shimokaji IP

(57) ABSTRACT

Silicate luminescent material and preparation method thereof are provided. The structural formula of the silicate luminescent material is $Zn_{2-y}(Si_{1-x}M_x)O_4:Mn_y$, wherein M is metal element and its oxide is conductive, x is in a range of 0.001 to 0.15, and y is in a range of 0.001 to 0.05. For integrated with conductive metal oxide component, the silicate luminescent material could take advantage of its conductive properties, and the silicate luminescent material could improve the luminescence properties under cathode ray significantly comparing with that of the luminescent material has not been integrated with conductive component. Accordingly, the luminescence efficiency of the above silicate luminescent material is increased.

10 Claims, 4 Drawing Sheets

SILICATE LUMINESCENT MATERIAL AND ITS PREPARATION METHOD

FIELD OF THE INVENTION

The present invention relates to the field of luminescent material, and specifically to silicate luminescent material and preparation method thereof.

BACKGROUND OF THE INVENTION

In recent years, luminescence devices, such as field emission devices, have received much attentions, due to they have the advantages of low operating voltage, little power consumption, no need of deflection coil, no X-ray radiation, anti-interference ability of radiation and magnetic field. The combination of field emission cathodes and luminescent material can provide field emission light source with high brightness and high color rendering, which can be applied in the fields such as displaying, various indicating and general lighting. The working principle of the field emission devices is similar to that of the traditional cathode ray tube (CRT), specifically, the application of imaging or lighting are realized by bombardment of electron beam to trichromatic fluorescence powder of red, green and blue. The field emission devices have potential advantages in the aspects such as brightness, viewing angle, response time, range of operating temperature and energy consumption.

The germanate luminescent material doped with rare earth ion has good photoluminescence properties, and could emit light with high fluorescence color and high brightness after been excitated, thus could be applied as trichromatic fluorescence of UV-LED. However, further improves the luminescence properties of the materials has been the targets of the researchers. One of the key factors of the preparation of field emission devices with excellent properties is the preparation of fluorescence powder with excellent properties. Currently, the fluorescence materials used in field emission devices mainly are the fluorescence powder of series sulfide, series oxide and series oxysulfide used in traditional cathode ray tube and projection television tubes. The fluorescence powder of series sulfide and series oxide have high brightness and certain electrical conductivity, while, these fluorescence powder are prone to be decomposed under the bombardment of large electron beam, could produce sulfur to poison the cathode tip, and could generate other sediment covering the fluorescence powder surface, thus reducing the luminescence efficiency of the fluorescence powder and decreasing the lifetime of the field emission devices. The fluorescence powder of series oxide have good stability, while their luminescence efficiency are not high enough, and they are generally made from insulators materials, both of the disadvantages are to be improved and enhanced.

SUMMARY OF THE INVENTION

In view of this, the present invention provides silicate luminescent material, which has conductive ability and high luminescence efficiency.

Meanwhile, the present invention provides the preparation method of silicate luminescent material, which is easy to carry out and the costs is low.

Silicate luminescent material, the structural formula of the luminescent material is $Zn_{2-y}(Si_{1-x}M_x)O_4:Mn_y$, wherein M is metal element and its oxide is conductive, x is in a range of 0.001 to 0.15, and y is in a range of 0.001 to 0.05.

And, the preparation method of silicate luminescent material, comprising the steps:

using the compound used as the source of zinc oxide, the compound used as the source of silica, the conductive metal oxide, and the compound used as the source of manganese dioxide as raw materials, all the raw materials are added at the molar ratio in the structure formula $Zn_{2-y}(Si_{1-x}M_x)O_4:Mn_y$, wherein M is metal element and its oxide is conductive, x is in a range of 0.001 to 0.15, and y is in a range of 0.001 to 0.05;

grinding and mixing all the raw materials homogeneously;

sintering the mixed raw materials and cooling them to obtain the silicate luminescent material.

In the above silicate luminescent material, for integrated with conductive metal oxide component, the silicate luminescent material could take advantage of its conductive properties, and the silicate luminescent material could improve the luminescence properties under cathode ray significantly comparing with that of the luminescent material have not been integrated with conductive component. Accordingly, the luminescence efficiency of the above silicate luminescent material is increased. Meanwhile, the luminescent material has the properties such as good stability, good uniformity, high transmittance, and good luminescence properties, thus the luminescent material can be applied in various lighting and displaying devices. In the above preparation method of silicate luminescent material, the silicate luminescent material can be obtained by the sintering process, thus the preparation method is easy to carry out and the costs is low, with broad prospects for production applications.

BRIEF DESCRIPTION OF THE DRAWINGS

Further description of the present invention will be illustrated, which combined with embodiments in the drawings.

Figure 2:
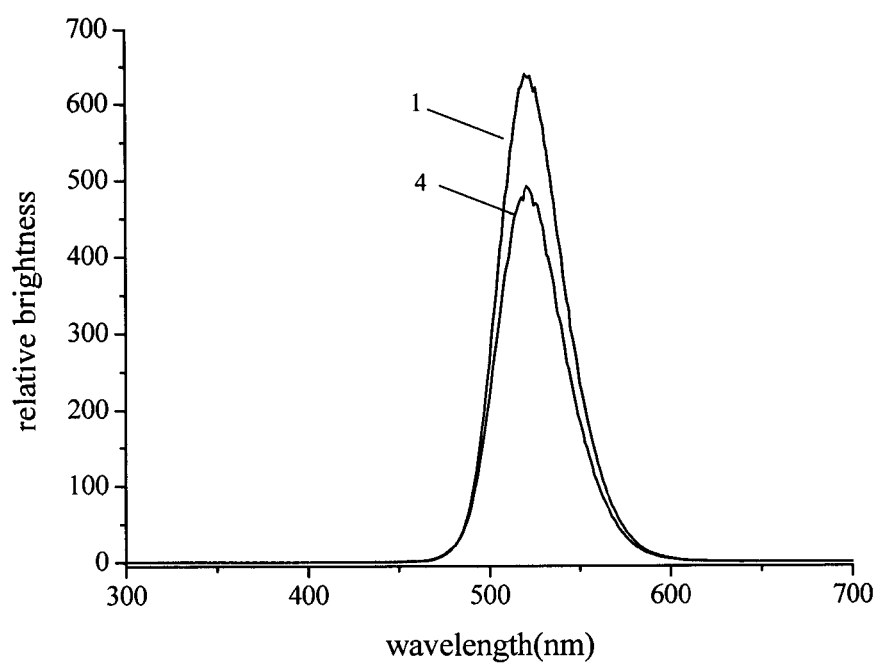
FIG. 2 shows the differences in the emission spectra of the comparison of the silicate luminescent material which is prepared in embodiment 3, and the silicate luminescent material $Zn_{1.994}SiO_4:Mn_{0.006}$ as they are tested in low voltage cathode ray excitation.
Figure 3:
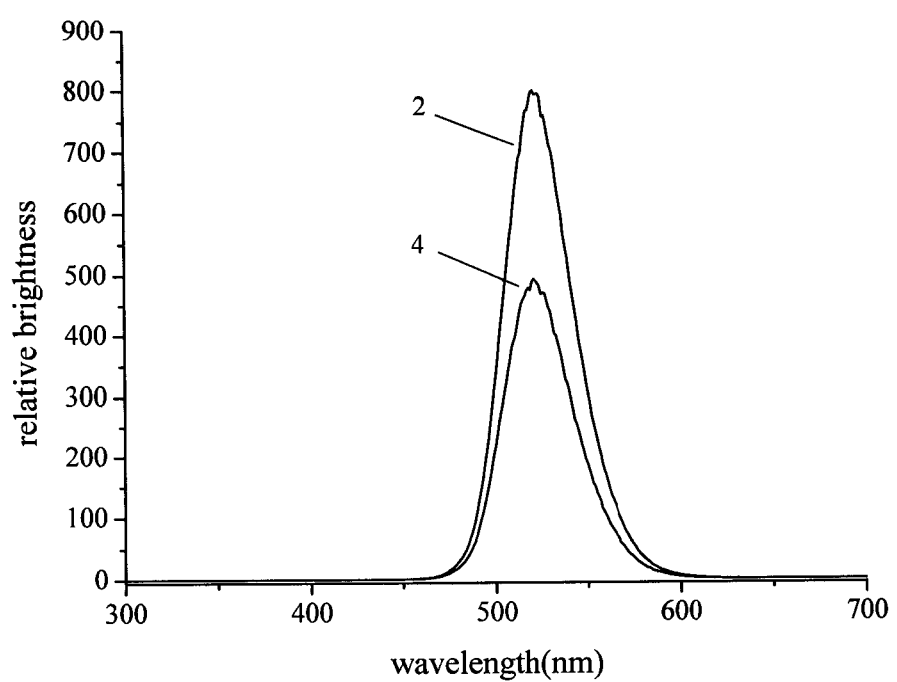
FIG. 3 shows the differences in the emission spectra of the comparison of the silicate luminescent material which is prepared in embodiment 6, and the silicate luminescent material $Zn_{1.994}SiO_4:Mn_{0.006}$ as they are tested in low voltage cathode ray excitation.
Figure 4:
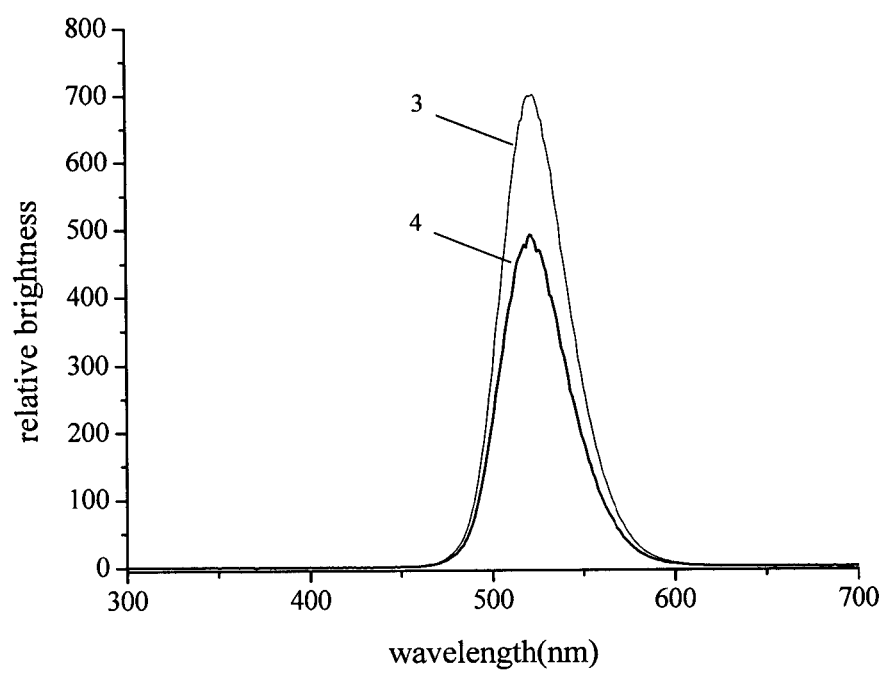
FIG. 4 shows the differences in the emission spectra of the comparison of the silicate luminescent material which is prepared in embodiment 8, and the silicate luminescent material $Zn_{1.994}SiO_4:Mn_{0.006}$ as they are tested in low voltage cathode ray excitation.

The emission spectras of the FIG. 2, FIG. 3 and FIG. 4 are analysised by spectrometer of Daojin RF-5301PC as detector, and the tests are under cathode ray excitation at the accelerating voltage of 5 KV.

DETAILED DESCRIPTION OF ILLUSTRATED EMBODIMENTS

Further description of the present invention will be illustrated, which combined with embodiments in the drawings, in order to make the purpose, the technical solution and the advantages clearer. While the present invention has been described with reference to particular embodiments, it will be understood that the embodiments are illustrative and that the invention scope is not so limited.

The silicate luminescent material of the embodiments has the structural formula of $Zn_{2-y}(Si_{1-x}M_x)O_4:Mn_y$, wherein M is metal element and its oxide is conductive, x is in a range of 0.001 to 0.15, and y is in a range of 0.001 to 0.05. Preferred, metal element M is indium, tin, or their combination, x in a range of 0.001 to 0.1, and y is in a range of 0.001 to 0.02.

In the above silicate luminescent material, $ZnSiO_4:Mn$ is used as luminescence substrate, and the $ZnSiO_4:Mn$ is doped with conductive component which is at least one of indium oxide and tin oxide, thus making the silicate luminescent material having the property of conductive, and the luminescence efficiency is increased.

Figure 1:
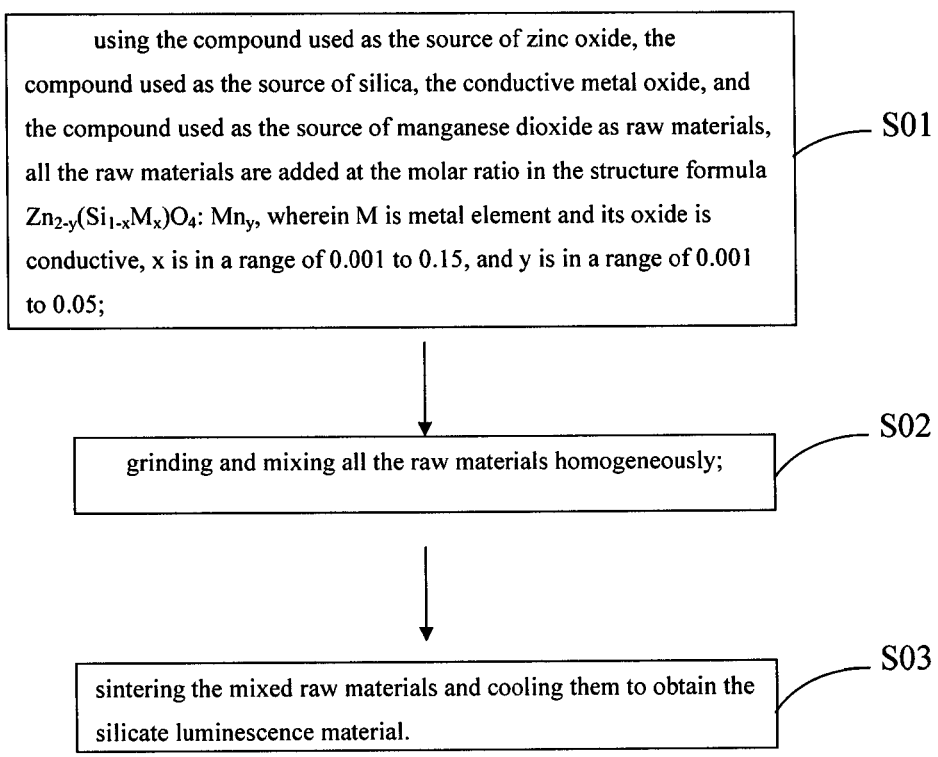
FIG. 1 shows the flow chart of the preparation method of silicate luminescent material in embodiments of the present invention.

See FIG. 1, FIG. 1 shows the flow chart of the preparation method of silicate luminescent material in embodiments of the present invention, comprising the steps of:

S01: using the compound used as the source of zinc oxide, the compound used as the source of silica, the conductive metal oxide, and the compound used as the source of manganese dioxide as raw materials, all the raw materials are added at the molar ratio in the structure formula $Zn_{2-y}(Si_{1-x}M_x)O_4:Mn_y$, wherein M is metal element and its oxide is conductive, x is in a range of 0.001 to 0.15, and y is in a range of 0.001 to 0.05;

S02: grinding and mixing all the raw materials homogeneously;

S03: sintering the mixed raw materials and cooling them to obtain the silicate luminescent material.

Wherein, the raw materials are: the compound used as the source of zinc oxide is at least one of zinc oxide, zinc oxalate and zinc acetate; the compound used as the source of silica are silica, and the compound used as the source of manganese dioxide is at least one of manganese oxide, manganese phosphate and manganese oxalate. Preferred, x is in a range of 0.001 to 0.1, and y is in a range of 0.001 to 0.02. Preferred, the conductive metal oxide is at least one of indium oxide and tin oxide, which can be either the indium oxide or the tin oxide, and also can be their combination such as indium tin oxide, the specific proportion of combination is in accordance with the actual needs, while the total mol fraction of the metal oxide should be within the above range.

In step S02, the raw materials are grinded and mixed homogeneously in a mortar, and then go to step S03. Specifically, the raw materials are sintered in the crucible at temperature in range of 1000 to 1400° C. for 1-8 hours. Preferred, the raw materials are sintered in the crucible at temperature in range of 1000 to 1350° C. for 2-6 hours.

Besides, the sintered products can be further grinded into powder to obtain fluorescence powder.

The silicate luminescent material of different composition, and its preparation method and properties are illustrated in the following embodiments.

Embodiment 1

Using $ZnO$, $SiO_2$, $SnO_2$ and $MnO_2$ as raw materials, adding 0.6507 g ZnO, 0.2401 g $SiO_2$, 0.0006 g $SnO_2$ and 0.0003 g $MnO_2$, grinding homogeneously and sintering at 1000° C. for 8 h, and then natural cooling in the furnace to the room temperature and grinding the sintered products into powder, finally obtaining luminescent material $Zn_{1.999}(Si_{0.999}Sn_{0.001})O_4:Mn_{0.001}$.

Embodiment 2

Using $Zn(CH_3COO)_2$, $SiO_2$, $In_2O_3$ and $MnCO_3$ as raw materials, adding 1.4669 g $Zn(CH_3COO)_2$, 0.2401 g $SiO_2$, 0.0005 g $In_2O_3$ and 0.0004 g $MnCO_3$, grinding homogeneously and sintering at 1400° C. for 1 h, and then natural cooling in the furnace to the room temperature and grinding the sintered products into powder, finally obtaining luminescent material $Zn_{1.999}(Si_{0.999}In_{0.001})O_4:Mn_{0.001}$.

Embodiment 3

Using $ZnO$, $SiO_2$, $SnO_2$ and $MnC_2O_4$ as raw materials, adding 0.6491 g ZnO, 0.2396 g $SiO_2$, 0.0018 g $SnO_2$ and 0.0030 g $MnC_2O_4$, grinding homogeneously and sintering at 1250° C. for 6 h, and then natural cooling in the furnace to the room temperature and grinding the sintered products into powder, finally obtaining luminescent material $Zn_{1.994}(Si_{0.997}Sn_{0.003})O_4:Mn_{0.006}$.

Embodiment 4

Using $ZnC_2O_4$, $SiO_2$, $SnO_2$ and $MnO_2$ as raw materials, adding 1.2265 g $ZnC_2O_4$, 0.2163 g $SiO_2$, 0.0600 g $SnO_2$ and 0.0073 g $MnO_2$, grinding homogeneously and sintering at 1350° C. for 4 h, and then natural cooling in the furnace to the room temperature and grinding the sintered products into powder, finally obtaining luminescent material $Zn_{1.98}(Si_{0.9}Sn_{0.1})O_4:Mn_{0.02}$.

Embodiment 5

Using $ZnO$, $SiO_2$, $SnO_2$ and $MnO_2$ as raw materials, adding 0.6348 g ZnO, 0.2043 g $SiO_2$, 0.0900 g $SnO_2$ and 0.0150 g $MnO_2$, grinding homogeneously and sintering at 1400° C. for 2 h, and then natural cooling in the furnace to the room temperature and grinding the sintered products into powder, finally obtaining luminescent material $Zn_{1.95}(Si_{0.85}Sn_{0.15})O_4:Mn_{0.05}$.

Embodiment 6

Using $ZnO$, $SiO_2$, $In_2O_3$ and $MnC_2O_4$ as raw materials, adding 0.6491 g ZnO, 0.2283 g $SiO_2$, 0.0250 g $In_2O_3$ and 0.0030 g $MnC_2O_4$, grinding homogeneously and sintering at 1250° C. for 6 h, and then natural cooling in the furnace to the room temperature and grinding the sintered products into powder, finally obtaining luminescent material $Zn_{1.994}(Si_{0.95}In_{0.05})O_4:Mn_{0.006}$.

Embodiment 7

Using $ZnO$, $SiO_2$, $In_2O_3$ and $MnC_2O_4$ as raw materials, adding 0.6478 g ZnO, 0.2043 g $SiO_2$, 0.0750 g $In_2O_3$ and 0.0050 g $MnC_2O_4$, grinding homogeneously and sintering at 1350° C. for 8 h, and then natural cooling in the furnace to the room temperature and grinding the sintered products into powder, finally obtaining luminescent material $Zn_{1.99}(Si_{0.85}In_{0.15})O_4:Mn_{0.01}$.

Embodiment 8

Using $ZnO$, $SiO_2$, $In_2O_3$ and $MnC_2O_4$ as raw materials, adding 0.6491 g ZnO, 0.2355 g $SiO_2$, 0.1000 g $In_2O_3$ and 0.0030 g $MnC_2O_4$, grinding homogeneously and sintering at 1250° C. for 6 h, and then natural cooling in furnace to the room temperature and grinding the sintered products into powder, finally obtaining luminescent material $Zn_{1.994}(Si_{0.98}In_{0.02})O_4:Mn_{0.006}$.

Embodiment 9

Using $ZnO$, $SiO_2$, $In_2O_3$, $SnO_2$ and $MnC_2O_4$ as raw materials, adding 0.6478 g ZnO, 0.2043 g $SiO_2$, 0.0500 g $In_2O_3$, 0.0300 g $SnO_2$ and 0.0050 g $MnC_2O_4$, grinding homogeneously and sintering at 1350° C. for 8 h, and then natural cooling in the furnace to the room temperature and grinding the sintered products into powder, finally obtaining luminescent material $Zn_{1.99}(Si_{0.85}In_{0.1}Sn_{0.05})O_4:Mn_{0.01}$.

See FIG. 2, FIG. 2 shows the curves 1 and 4 in the emission spectra of the comparison of the silicate luminescent material $Zn_{1.994}(Si_{0.997}Sn_{0.003})O_4:Mn_{0.006}$ which is prepared in embodiment 3, and the fluorescence powder $Zn_{1.994}SiO_4:Mn_{0.006}$, they are both tested in low voltage cathode ray excitation under cathode ray excitation at the accelerating voltage of 5 KV. As shown in FIG. 2, the silicate luminescent material which is prepared in embodiment 3 emit green light at 522 nm, its luminescence intensity is greater enhanced comparing with that of $Zn_{1.994}SiO_4:Mn_{0.006}$. It is indicated that the luminescence intensity of the silicate luminescent material is enhanced after the silicate luminescent material is added with component $SnO_2$.

See FIG. 3, FIG. 3 shows the curves 2 and 4 in the emission spectra of the comparison of the silicate luminescent material $Zn_{1.994}(Si_{0.95}In_{0.05})O_4:Mn_{0.006}$ which is prepared in embodiment 6, and the fluorescence powder $Zn_{1.994}SiO_4:Mn_{0.006}$, they are both tested in low voltage cathode ray excitation under cathode ray excitation at the accelerating voltage of 5 KV. As shown in FIG. 2, the silicate luminescent material which is prepared in embodiment 6 emit green light at 522 nm, its luminescence intensity is greater enhanced comparing with that of $Zn_{1.994}SiO_4:Mn_{0.006}$. It is indicated that the luminescence intensity of the silicate luminescent material is enhanced after the silicate luminescent material is added with component $In_2O_3$.

See FIG. 4, FIG. 4 shows the curves 3 and 4 in the emission spectra of the comparison of the silicate luminescent material $Zn_{1.994}(Si_{0.98}In_{0.02})O_4:Mn_{0.006}$ which is prepared in embodiment 8, and the fluorescence powder $Zn_{1.994}SiO_4:Mn_{0.006}$, they are both tested in low voltage cathode ray excitation under cathode ray excitation at the accelerating voltage of 5 KV. As shown in FIG. 2, the silicate luminescent material which is prepared in embodiment 8 emit green light, its luminescence intensity is greater enhanced comparing with that of $Zn_{1.994}SiO_4:Mn_{0.006}$. It is indicated that the luminescence intensity of the silicate luminescent material is enhanced after the silicate luminescent material is added with component $In_2O_3$.

It is seen from the emission spectra of the comparison of the silicate luminescent material prepared in embodiment 3, 6, 8 and the fluorescence powder $Zn_{1.994}SiO_4:Mn_{0.006}$, for integrated with conductive metal oxide component, the silicate luminescent material could take advantage of its conductive properties, and the silicate luminescent material could improve the luminescence properties under cathode ray significantly comparing with that of the luminescent material has not been integrated with conductive component. Accordingly, the luminescence efficiency of the above silicate luminescent material is increased. Meanwhile, the luminescent material has the properties such as good stability, good uniformity, high transmittance, and good luminescence properties, thus the luminescent material can be applied in various lighting and displaying devices. In the above preparation method of silicate luminescent material, the silicate luminescent material can be obtained by the sintering process, thus the preparation method is easy to carry out and the costs are low, with broad prospects for production applications.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. Silicate luminescent material, wherein, the structural formula of said luminescent material is $Zn_{2-y}(Si_{1-x}M_x)O_4:Mn_y$, wherein M is metal element and its oxide is conductive; said metal element M is at least one of indium and tin; x is in a range of 0.02-0.15, and y is in a range of 0.001 to 0.05.

2. Silicate luminescent material according to claim 1, wherein, said y is in a range of 0.001 to 0.02.

3. A preparation method of silicate luminescent material, comprising the steps of:
using the compound used as the source of zinc oxide, the compound used as the source of silica, the conductive metal oxide, and the compound used as the source of manganese dioxide as raw materials, all the raw materials are added at the molar ratio in the structure formula $Zn_{2-y}(Si_{1-x}M_x)O_4:Mn_y$, wherein M is metal element and its oxide is conductive, said metal element M is at least one of indium and tin, x is in a range of 0.02-0.15, and y is in a range of 0.001 to 0.05;
grinding and mixing all the raw materials homogeneously;
sintering the mixed raw materials and cooling them to obtain the silicate luminescent material.

4. The preparation method of silicate luminescent material according to claim 3, wherein, said raw materials are sintered in the crucible at the temperature in a range of 1000 to 1400° C. for 1 to 8 hours.

5. The preparation method of silicate luminescent material according to claim 3, wherein, said compound used as the source of zinc oxide is at least one of zinc oxide, zinc oxalate and zinc acetate, said compound used as the source of silica is silica, and said compound used as the source of manganese dioxide is at least one of manganese oxide, manganese phosphate and manganese oxalate.

6. The preparation method of silicate luminescent material according to claim 3, wherein, said conductive metal oxide is indium oxide, tin oxide or indium tin oxide.

7. The preparation method of silicate luminescent material according to claim 3, wherein, the sintered products be further grinded into powder to obtain fluorescence powder.

8. The preparation method of silicate luminescent material according to claim 3, wherein, said y is in a range of 0.001 to 0.02.

9. The preparation method of silicate luminescent material according to claim 3, wherein said metal element M is tin or a combination of indium and tin.

10. Silicate luminescent material, wherein the structural formula Of said luminescent material is $Zn_{2-y}(Si_{1-x}M_x)O_4:Mn_y$, wherein M is metal element and its oxide is conductive; said metal element M is tin or a combination of indium and tin; x is in a range of 0.001 to 0.15, and y is in a range of 0.001 to 0.05.

* * * * *